(12) United States Patent
Hatano

(10) Patent No.: US 7,852,737 B2
(45) Date of Patent: Dec. 14, 2010

(54) OPTICAL PICKUP

(75) Inventor: Shinya Hatano, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 608 days.

(21) Appl. No.: 11/892,966

(22) Filed: Aug. 28, 2007

(65) Prior Publication Data
US 2008/0056101 A1   Mar. 6, 2008

(30) Foreign Application Priority Data
Aug. 30, 2006   (JP) ............... 2006-233565

(51) Int. Cl.
*G11B 7/00* (2006.01)
(52) U.S. Cl. ................. 369/112.24
(58) Field of Classification Search ........... None
See application file for complete search history.

(56) References Cited

U.S. PATENT DOCUMENTS

| | | | | |
|---|---|---|---|---|
| 7,352,517 | B2 * | 4/2008 | Kimura | 359/719 |
| 2005/0007906 | A1 | 1/2005 | Horinouchi et al. | 369/44.37 |
| 2006/0072210 | A1 | 4/2006 | Chang | 359/661 |
| 2007/0014205 | A1 * | 1/2007 | Inui | 369/44.14 |

FOREIGN PATENT DOCUMENTS

| | | |
|---|---|---|
| CN | 1802700 | 7/2006 |
| JP | 05-101429 | 4/1993 |
| JP | 07-220286 | 8/1995 |
| JP | 10-11765 | 1/1998 |
| JP | 2001-004891 | 1/2001 |
| JP | 2001-67700 | 3/2001 |
| JP | 2002-269790 | 9/2002 |
| JP | 2006-019001 | 1/2006 |

* cited by examiner

*Primary Examiner*—Joseph Haley
(74) *Attorney, Agent, or Firm*—Morgan Lewis & Bockius LLP (57) ABSTRACT

An optical pickup includes a first objective lens, a second objective lens having a numerical aperture different from that of the first objective lens, and an objective lens holder. The first objective lens is attached to the objective lens holder via a spacer that has a cylindrical shape and is provided with a lens receiving portion of a stepped shape for receiving the first objective lens, a protruding portion having cushioning properties that protrudes from the upper surface, and a salient portion having a spherical shape formed at the lower surface. The protruding portion is formed so that a tip thereof is closer to an optical disc medium than any other part of the objective lens holder.

33 Claims, 7 Drawing Sheets

OPTICAL PICKUP

This application is based on Japanese Patent Application No. 2006-233565 filed on Aug. 30, 2006, the contents of which are hereby incorporated by reference.

BACKGROUND OF THE INVENTION

1. Field of the Invention

The present invention relates to an optical pickup that projects a laser beam to an optical disc for reproducing or recording data, in particular an optical pickup including lenses having different numerical apertures for recording or reproducing a CD medium, a DVD medium and a BD medium.

2. Description of Related Art

An optical disc apparatus performs recording or reproducing of data by projecting a laser beam from an optical pickup to an optical disc that is a recording medium. If the optical disc apparatus can reproduce a CD (Compact Disc) medium and a DVD (Digital Versatile Disc) medium, the optical pickup is equipped with a laser light source that emits an infrared laser for a CD (approximately 780 nm) and a red laser for a DVD (approximately 650 nm). In addition, the optical pickup is equipped with an objective lens that condenses the laser beam to be a laser spot projected on a recording surface of the optical disc. A diameter of the laser spot is proportional to a wavelength of the laser beam and is inversely proportional to a numerical aperture (NA) of the objective lens. Since a CD medium and a DVD medium have different track widths, they need different objective lenses. However, it is possible that a single objective lens supports both CD media and DVD media by changing a shape of the objective lens.

Furthermore, these days, a BD (Blu-Ray Disc) having more storage capacity than the DVD has become available. Since a BD medium has higher recording density than a DVD medium, a track width of a BD medium is much smaller than a track width of a DVD medium. Therefore, a laser spot for a BD has to be smaller than that for a DVD. Therefore, a laser light source that emits blue laser having a shorter wavelength (approximately 405 nm) than the infrared laser or the red laser is used for recording and reproducing data on a BD medium.

In addition, the optical pickup described above detects reflection light from the optical disc, so that a position of the laser spot on the optical disc can be detected or data can be read. Therefore, it is necessary to project the laser beam to the optical disc so that an angle between the optical axis of the laser beam and the recording surface of the optical disc (tilt angle) becomes normally a constant angle (a right angle in many cases).

For this reason, there is proposed a structure in which an intermediate member is disposed between the objective lens and a lens holder to which the objective lens is attached in order to adjust an angle of the objective lens. The lens holder retains the intermediate member, and the contacting surface of the lens holder has substantially a spherical shape. In addition, a surface of the lens holder that contacts with the intermediate member has a conical shape or a stepped shape. An angle of the objective lens can be adjusted by rotating the intermediate member (see JP-A-H5-101429 and JP-A-H7-220286).

In addition, there is proposed a structure in which an objective lens has a spherical salient portion, a lens holder has a recess of a spherical shape that receives the spherical salient portion, the salient portion of the objective lens is arranged to engage with the recess of the lens holder, and the objective lens is moved to slide for adjusting the optical axis (see JP-A-7-220286, JP-A-2001-4891 and the like).

On the other hand, the objective lens for a CD and a DVD cannot converge the blue laser sufficiently because its NA is small, so it cannot record or reproduce a BD medium correctly. Further, if the objective lens for a BD is used, it cannot make the infrared laser or the red laser converge appropriately. Therefore, there is proposed a structure in which two objective lenses having different numerical apertures, i.e., the objective lens for a CD and a DVD and the objective lens for a BD are disposed on the lens holder that holds the objective lenses.

In this way, using the optical pickup equipped with two objective lenses having different numerical apertures, appropriate laser spots can be converged on the recording surfaces of the optical discs having different track widths so that recording and reproducing can be performed accurately (see JP-A-2006-19001 and the like).

Since the objective lens for recording and reproducing a BD medium has a short focal length so that its working distance is shorter than that is the objective lens for recording and reproducing a CD medium and a DVD medium, the objective lens for a BD medium is disposed at a position closer to the optical disc than the objective lens for a CD and a DVD in the objective lens holder to which the both objective lenses are attached.

However, in the conventional optical pickup having two objective lenses as described above, the working distance of the objective lens for a BD is short. For this reason, there may be a case where the objective lens for a BD and/or the objective lens holder contact with the optical disc medium (a CD medium, a DVD medium or a BD medium) when objective lens holder moves in the focusing direction for pulling in focusing or the like. If the objective lens and/or the objective lens holder contact with the optical disc medium, the optical pickup or the optical disc medium may be damaged and cause a malfunction. In addition, if there is a mismatching state of the tilt angle between the two objective lenses, coma aberration occurs so that performance of the optical pickup is lowered.

The coma aberration can be suppressed by adopting a mechanism for adjusting a tilt angle of the objective lens that is used in the optical pickup disclosed in JP-A-H5-101429, JP-A-H7-220286 or JP-A-2001-4891. However, when the tilt angle of the objective lens is adjusted, there will be a part in which a distance between the objective lens and/or the objective lens holder and the optical disc medium becomes shorter than the working distance compared with the case where the objective lens is attached normally to the objective lens holder. Then, the objective lens and/or the objective lens holder may contact with the optical disc medium, which may cause a malfunction or damage to the optical pickup and/or the optical disc medium.

SUMMARY OF THE INVENTION

An object of the present invention is to provide an optical pickup that includes objective lenses having two different numerical apertures and can improve accuracy of recording and reproducing a plurality of optical disc medium such as a CD medium, a DVD medium and a BD medium, even if an error occurs in the objective lens and the objective lens holder in the manufacturing and/or assembling process.

Another object of the present invention is to provide an optical pickup that includes objective lenses having two different numerical apertures and can suppress an accident in recording and reproducing by suppressing a malfunction or a damage to the optical pickup and/or the optical disc medium due to a contact between the objective lens and/or objective lens holder and the optical disc medium such as a CD medium, a DVD medium or a BD medium when the optical pickup moves in the focusing direction.

An optical pickup according to an embodiment of the present invention is an optical pickup that projects a laser beam to an optical disc medium for recording or reproducing data. The optical pickup includes a first objective lens, a second objective lens having a numerical aperture different from that of the first objective lens, an objective lens holder that holds the first objective lens and the second objective lens, and a spacer that retains the first objective lens and is attached to the objective lens holder. The spacer has a cylindrical shape and is provided with a lens receiving portion of a stepped shape formed at the inner surface thereof for receiving the first objective lens, a protruding portion having cushioning properties that protrudes from the upper surface, and a salient portion having a spherical shape formed at the lower surface. The objective lens holder has a first mounting hole that passes through from the lower surface to the upper surface to which the spacer retaining the first objective lens is attached, and a second mounting hole that passes through from the lower surface to the upper surface to which the second objective lens is fixed. The protruding portion of the spacer is formed so that a tip thereof is closest to the optical disc medium than other parts of the objective lens holder.

According to this structure, even if the objective lens holder moves very close to the optical disc for pulling in focusing or the like, the optical disc contacts with the protruding portion having cushioning properties so that contact between other part of the objective lens holder and the optical disc can be suppressed. Since the protruding portion is a member made of a material having cushioning properties, damage to the optical disc can be suppressed, and it is able to prevent the optical disc from becoming unable to record and reproduce data.

In addition, it is able to suppress a damage to the objective lens due to a contact between an optical element such as the first objective lens or the second objective lens and the optical disc. It is able to prevent the optical pickup from becoming unable to project the laser beam appropriately, from becoming unable to record and reproduce data, or from lowering accuracy, due to damage to the objective lens.

In a preferred embodiment of the present invention, the protruding portion may be formed integrally with the spacer. In addition, the protruding portion may be formed to have a tip of a curved surface. If the protruding portion is formed integrally with the spacer, effort of producing the spacer can be reduced so that time necessary for production can be reduced. In addition, if the protruding portion is formed to have a tip of a curved surface, the optical disc is hardly damaged from a contact between them, so that the optical pickup can perform recording and reproducing stably for a long period.

In a preferred embodiment of the present invention, the salient portion having a spherical shape may be a part of a spherical shape having a center that is an optical principal point of the first objective lens that fits in the spacer. In addition, a recess having a spherical shape in which the salient portion having a spherical shape fits may be formed at an upper side edge portion of the first mounting hole. In this way, since the center of the salient portion having a spherical shape is the optical principal point of the first objective lens, the optical principal point stays normally at the same position and the constant place with respect to the first mounting hole even if the spacer is rotated. Therefore, accuracy of projecting the laser beam can be improved. In addition, since the recess having a spherical shape in which the salient portion having a spherical shape fits is formed at the first mounting hole, the spacer can be moved stably so that tilt adjustment can be performed with high accuracy.

In a preferred embodiment of the present invention, the objective lens holder has a shape such that the second objective lens is closer to the optical disc medium than the first objective lens.

In the structure described above, the objective lens holder may be supported elastically by an elastic support member, and electric power may be supplied to a tracking coil and a focusing coil for driving the objective lens holder via the elastic support member. Further, the objective lens holder may be retained in a slidable and rotatable manner by a rotating shaft that passes through the objective lens holder.

In a preferred embodiment of the present invention, the medium for recording and reproducing can be a CD medium, a DVD medium or a BD medium. The CD medium includes a CD-ROM medium, a CD-R medium, a CD-RW medium and the like. The DVD medium includes a DVD-ROM medium, a DVD-R medium, a DVD+R medium, a DVD-RW medium, a DVD+RW medium, a DVD-RAM medium and the like.

An optical pickup according to another embodiment of the present invention is an optical pickup that projects a laser beam to an optical disc medium for recording or reproducing data. The optical pickup includes an infrared laser light source that emits an infrared laser beam, a red laser light source that emits a red laser beam, a blue laser light source that emits a blue laser beam, a first objective lens that condenses the infrared laser beam or the red laser beam onto a recording surface of a CD medium or a DVD medium that is the optical disc medium, a second objective lens that condenses the blue laser beam onto a recording surface of a BD (Blu-ray Disc) medium that is the optical disc medium, an objective lens holder that holds the first objective lens and the second objective lens and is capable of moving in a tracking direction and in a focusing direction, a tracking coil that generates a force to drive the objective lens holder in the tracking direction, a focusing coil that generates a force to drive the objective lens holder in the focusing direction, an elastic support member that supports the objective lens holder elastically and supplies electric power to the tracking coil and the focusing coil, a spacer that retains the first objective lens and is attached to the lens holder. The spacer has a cylindrical shape and is provided with a lens receiving portion of a stepped shape formed at the inner surface for receiving the first objective lens, two protruding portions having cushioning properties that protrude from the upper surface and are formed to have a tip of a curved surface, a positioning portion that protrudes in the radial direction from the outer peripheral surface for positioning the spacer, two press portions that protrude in the radial direction from the outer peripheral surface away from the positioning portion to the opposite directions by the same angle, and a salient portion formed at the lower surface to have a spherical shape with a center that is a optical principal point of the first objective lens fitting in the spacer. The objective lens holder is provided with a first mounting hole that passes through from the lower surface to the upper surface and has a recess having a spherical shape in which the salient portion of the spacer with the first objective lens fits, and a second mounting hole that passes through from the lower surface to the upper surface had has a fixing portion of a stepped shape to which the second objective lens is engaged and fixed. The fixing portion is formed so that the second objective lens is closer to the optical disc medium than the first objective lens, and the protruding portion of the spacer is formed so that a distance between the tip thereof and the optical disc medium is shorter than a distance between the second objective lens and the optical disc medium.

DETAILED DESCRIPTION OF THE PREFERRED EMBODIMENTS

Figure 1:
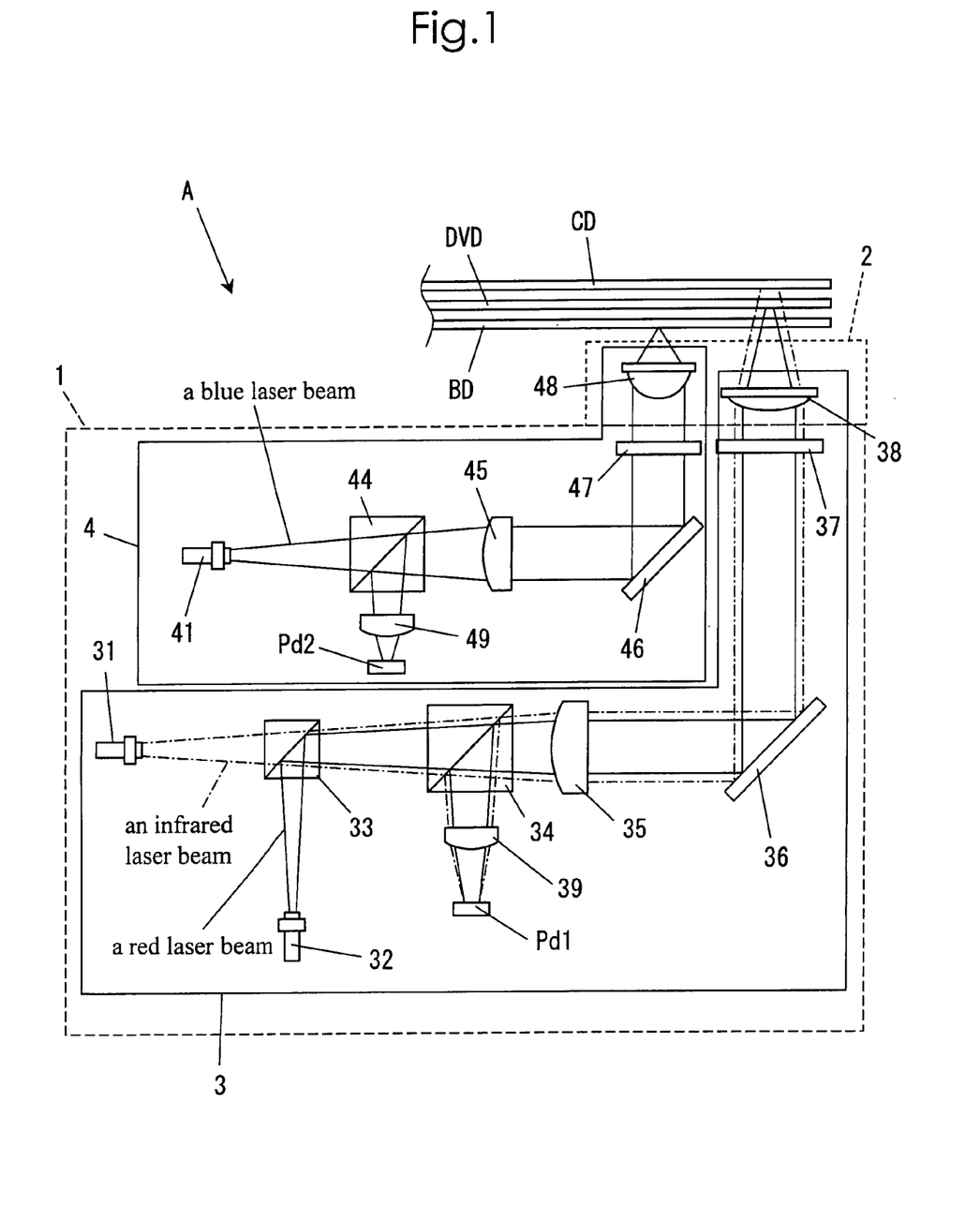
FIG. 1 is a layout diagram showing a structure of an example of an optical pickup according to the present invention.

Hereinafter, an embodiment of the present invention will be described with the attached drawings. FIG. 1 is a layout diagram showing a structure of an example of an optical pickup according to the present invention. An optical pickup A shown in FIG. 1 includes a main body 1 and an actuator 2 that drives an objective lens. The optical pickup A shown in FIG. 1 includes a first optical system 3 for recording and reproducing a CD medium or a DVD medium and a second optical system 4 for recording and reproducing a BD medium. As to the optical pickup shown in FIG. 1, an optical path of an infrared laser is shown by a dashed dotted line, and an optical path of a red laser is shown by a solid line for convenience sake. In addition, an optical path of a blue laser is also shown by a solid line. Here, the CD medium includes a CD-ROM medium, a CD-R medium, a CD-RW medium and the like, and the DVD medium includes a DVD-ROM medium, a DVD-R medium, a DVD+R medium, a DVD-RW medium, a DVD+RW medium, a DVD-RAM medium and the like.

The first optical system 3 includes at least an infrared laser light source 31, a red laser light source 32, a dichroic prism 33, a polarizing beam splitter 34, a collimator lens 35, an upstand mirror 36, a quarter wave plate 37, a first objective lens 38, a sensor lens 39 and a photo detector Pd1.

The infrared laser light source 31 emits an infrared laser beam having a wavelength of approximately 780 nm, which is used for recording and reproducing of the CD medium. The red laser light source emits a red laser beam having a wavelength of approximately 650 nm, which is used for recording and reproducing of the DVD medium. The dichroic prism 33 is a prism that allows light having a wavelength in an infrared range to pass through and reflects light having a wavelength in a red range. In other words, the laser beam emitted from the infrared laser light source 31 pass through the dichroic prism 33, while the laser beam emitted from the red laser light source 32 is reflected by the reflecting surface of the dichroic prism 33 and goes out from the dichroic prism 33. Although the dichroic prism in the present embodiment allows the infrared laser beam to pass through and reflects the red laser beam, the present invention is not limited to this structure.

The polarizing beam splitter 34 is a prism allows an incident laser beam to pass or reflects the same depending on its polarization direction. In the present invention, the laser beams emitted from the infrared laser light source 31 and the red laser light source 32 and enter the polarizing beam splitter 34 pass through the same, while the laser beam reflected by the recording surface of the CD medium or the DVD medium is reflected by the polarizing beam splitter 34. The collimator lens 35 converts the laser beam that is diverging light emitted from the infrared laser light source 31 or the red laser light source 32 as a point light source into parallel rays. The laser beam that goes out from the collimator lens 35 is reflected by the upstand mirror 36 in the orthogonal direction. Thus, the optical path of the laser beam is changed to the direction that is perpendicular to a recording layer of the CD medium or the DVD medium.

The quarter wave plate 37 converts the incident light of linear polarization into light of circular polarization or converts light of circular polarization into light of linear polarization. As the first objective lens 38, an aspherical lens is adopted. The first objective lens 38 makes the infrared laser beam to converge into a laser spot on the recording surface of the CD medium and makes the red laser beam to converge into a laser spot on the recording surface of the DVD medium.

The laser beam reflected by the recording surface of the CD medium or the DVD medium enters the quarter wave plate 37 again. On this occasion, the reflected laser beam is converted from the circular polarization into the linear polarization. The polarization direction of the laser beam after the conversion into the linear polarization is perpendicular to the polarization direction of the laser beam emitted from the infrared laser light source or the red laser light source. Thus, the laser beam does not pass through the polarizing beam splitter 34 but is reflected by the same so as to enter the light receiving element Pd1 via the sensor lens 39. The photo detector Pd1 converts the incident laser beam into an electric signal, which is used as an output signal for recording and reproducing.

The second optical system 4 includes at least a blue laser light source 41, a polarizing beam splitter 44, a collimator lens 45, an upstand mirror 46, a quarter wave plate 47, a second objective lens 48, a sensor lens 49 and a photo detector Pd2. The second optical system 4 includes a laser light source that is the blue laser light source 41 that emits a blue laser beam having a wavelength of approximately 405 nm and an objective lens that is the second objective lens 48, but it does not includes the dichroic prism 33, which is different from the first optical system 3. However, other members provided to the second optical system 4 are substantially the same as those of the first optical system 3, so detailed description thereof will be omitted.

Among the optical elements described above, the first objective lens 38 of the first optical system 3 and the second objective lens 48 of the second optical system 4 are disposed on the actuator 2. The actuator 2 is attached to the main body 1.

Figure 2:
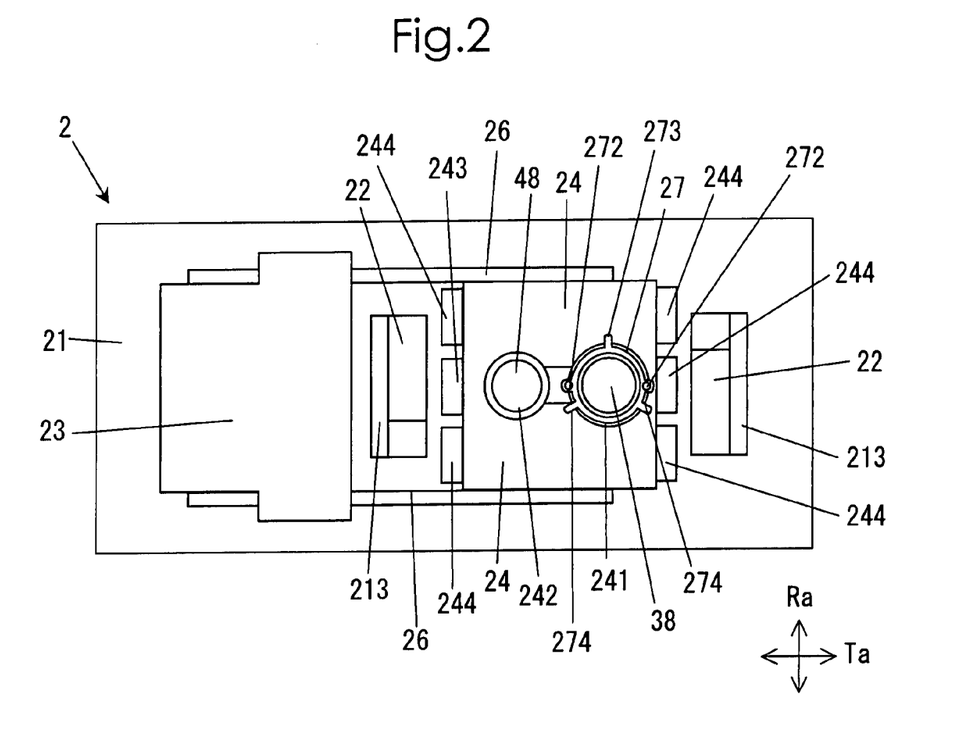
FIG. 2 is a plan view of an example of an actuator that is provided to the optical pickup according to the present invention.
Figure 3:
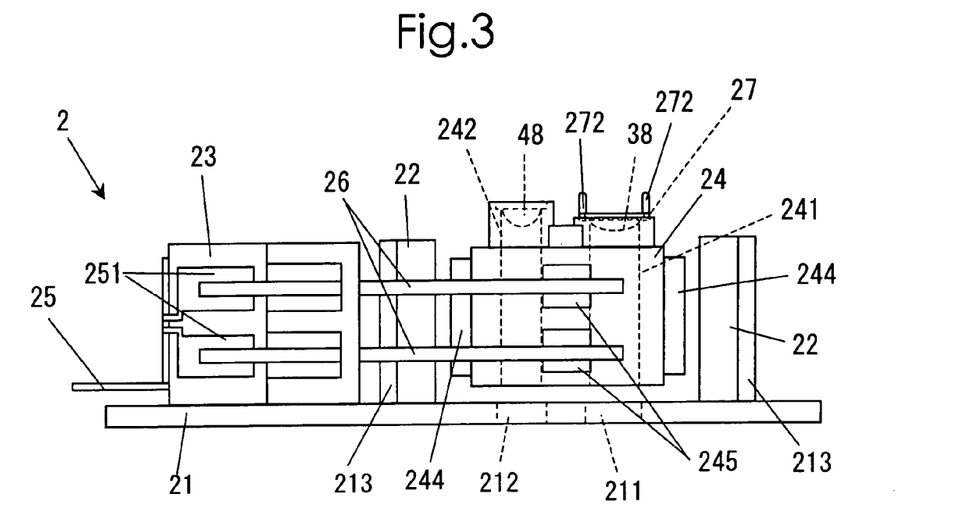
FIG. 3 is a front view of the actuator shown in FIG. 2.
Figure 4:
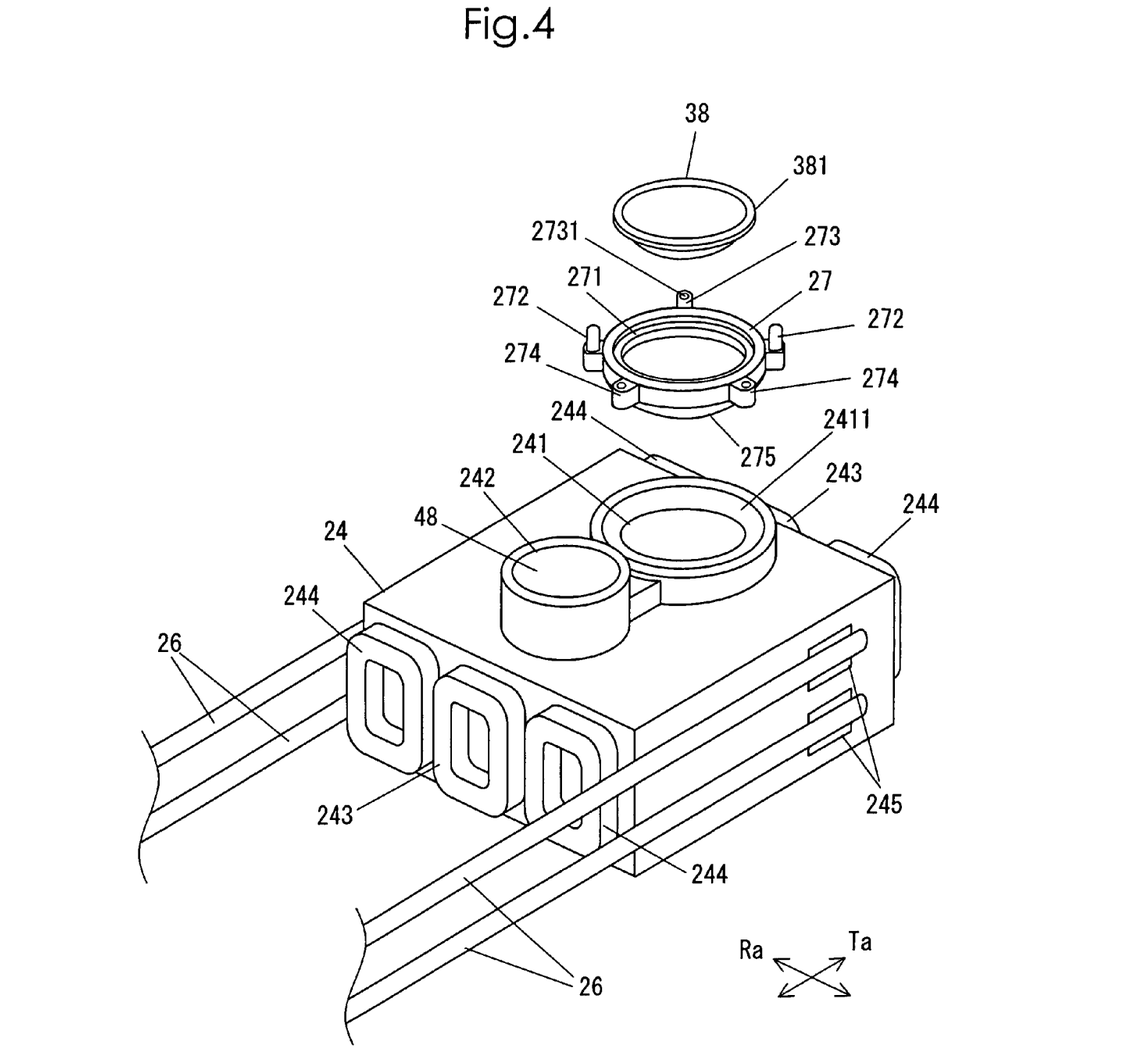
FIG. 4 is an enlarged perspective view of an objective lens holder that is used for the actuator shown in FIG. 2.

FIG. 2 is a plan view of an example of the actuator that is provided to the optical pickup according to the present invention, FIG. 3 is a front view of the actuator shown in FIG. 2, and FIG. 4 is an enlarged perspective view of an objective lens holder that is used for the actuator shown in FIG. 2. The actuator 2 includes an actuator base 21, a permanent magnet 22, a support member 23, an objective lens holder 24 that holds the first objective lens 38 and the second objective lens 48, a power substrate 25, wire springs 26 and a spacer 27. Reference sign Ra in FIG. 2 indicates a radial direction of the optical disc medium (the CD medium, the DVD medium or the BD medium), and reference sign Ta indicates a tangential direction (circumferential direction). As shown in FIGS. 2 and 4, the first objective lens 38 and the second objective lens 48 are arranged in the Ta direction in the optical pickup A.

The actuator base 21 made up of a metal plate that is punched, cut and bent. As shown in FIG. 3, the actuator base 21 is provided with a first through hole 211 through which the infrared laser beam or the red laser beam passes, a second through hole 212 through which the blue laser beam passes and a magnet retaining portion 213 that retains the permanent magnet 22 and works as a back yoke. The permanent magnet 22 generates a magnetic field that affects the objective lens holder 24 and is made up of a neodymium magnet though it is not a limitation. The support member 23 is made of resin and is fixed securely to the actuator base 21 by a bolt that is not shown. In addition, without limiting to the bolt, various means such as fitting, welding, adhesion or the like can be used for fixing it so as not to be removed from the actuator base 21.

The objective lens holder 24 includes a first mounting hole 241 that passes through it from the bottom face to the top face, to which the spacer 27 with the first objective lens 38 is attached on the upper end portion, a second mounting hole 242 that passes through it from the bottom face to the top face, to which the second objective lens 48 is attached on the upper end portion, a focusing coil 243 for moving the objective lens holder 24 to move in the optical axis direction, a tracking coil 244 for moving the objective lens holder 24 to slide along the radial direction of the optical disc, connection terminals 245 for supplying electric power to the focusing coil 243 and the tracking coil 244.

The power substrate 25 is made up of an FPC (Flexible Print Circuit) having flexible property, and it is adhered to cover approximately a half of the support member 23. The power substrate 25 is not limited to the FPC, but it can be various materials that can be attached to the support member 23 stably. The power substrate 25 has terminal portions 251 for supplying electric power.

The objective lens holder 24 is supported elastically by the support member 23 via the wire springs 26 so that its bottom does not contact with the actuator base 21. The wire springs 26 are conductive elastic members that are fixed to contact with the connection terminals 245 of the objective lens holder 24. In addition, they contact with the terminal portions 251 of the power substrate 25 that is fixed to the support member 23. In this way, the terminal portions 251 and the connection terminals 245 are connected to each other electrically via the wire springs 26, so that power substrate 25 can supply electric power to the focusing coil 243 and the tracking coil 244 via the wire springs 26.

Figure 5:
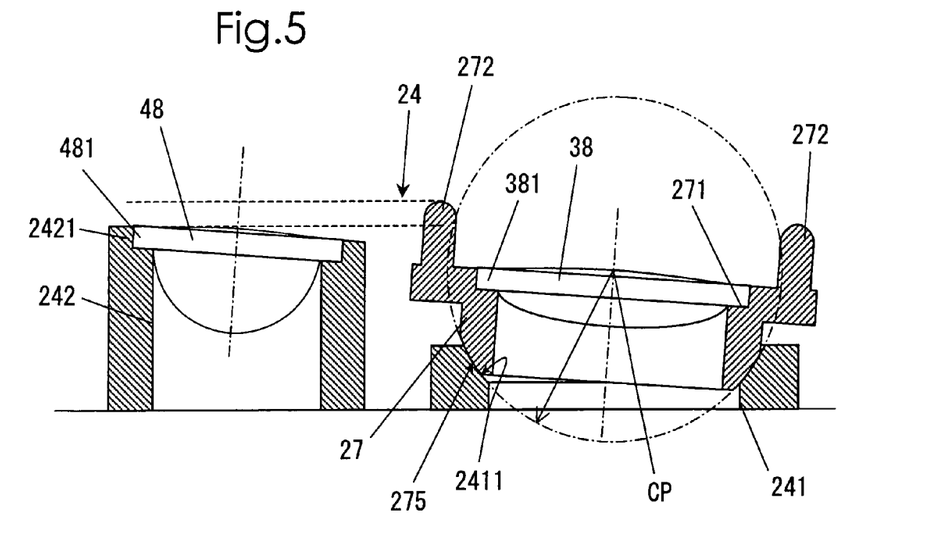
FIG. 5 is a cross sectional view of an objective lens mounting portion of the objective lens holder.

The objective lens holder 24 will be described more in detail. FIG. 5 is a cross sectional view of an objective lens mounting portion of the objective lens holder. As to the objective lens holder 24 shown in FIG. 5, an attachment portion of the second mounting hole 242 is tilted due to an error or the like, so the second objective lens 48 is attached in a state where its optical axis is tilted. FIG. 5 shows the tilt in an exaggerated manner so that it can be recognized easily. As shown in FIG. 5, the first objective lens 38 and the second objective lens 48 respectively have supported portions 381 and a supported portion 481 of a flange-like shape at their rim portions.

The objective lens holder 24 is provided with the first objective lens 38 for recording and reproducing the CD medium or the DVD medium and the second objective lens 48 for recording and reproducing the BD medium. The second objective lens 48 has a larger numerical aperture (NA=0.85) than the first objective lens 38 does, so its focal length is shorter. Therefore, as shown in FIGS. 4 and 5, the first mounting hole 241 and the second mounting hole 242 are formed so that the attachment position of the second objective lens 48 is closer to the optical disc than that of the first objective lens 38.

As shown in FIG. 5, the second mounting hole 242 is provided with an stepped attachment portion 2421 having a step in which the second objective lens 48 can fit. The second objective lens 48 is provided with the flange-like supported portion 481 at the rim portion. The stepped attachment portion 2421 of the second mounting hole 242 is engaged with the supported portion 481 of the second objective lens 48, and the attachment portion 2421 is bonded to the supported portion 481 with adhesive. Although it is not shown, an inlet groove for injecting adhesive is formed on the upper end portion of the second mounting hole 242. By injecting adhesive into the inlet groove, the side portion of the supported portion 481 is bonded to the second mounting hole 242 with the adhesive. The adhesive is preferably a one that can bond the second objective lens 48 to the second mounting hole 242 securely and hardly cause a malfunction such as deformation or breakage of the second objective lens 48 due to a stress caused by curing condition (heat) or contraction when it is cured. Although it is not a limitation, an ultraviolet curing adhesive is adopted here.

Figure 6:
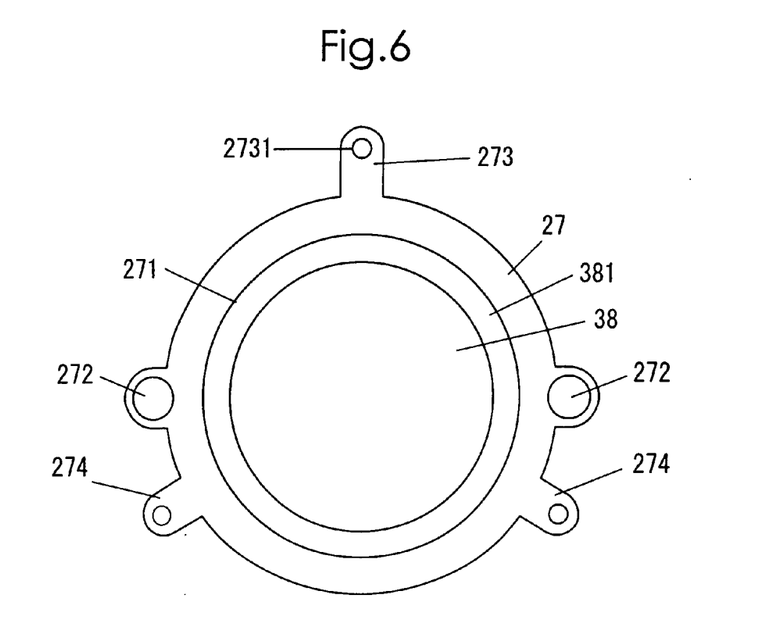
FIG. 6 is a plan view of a spacer that is used for the optical pickup according to the present invention.
Figure 7:
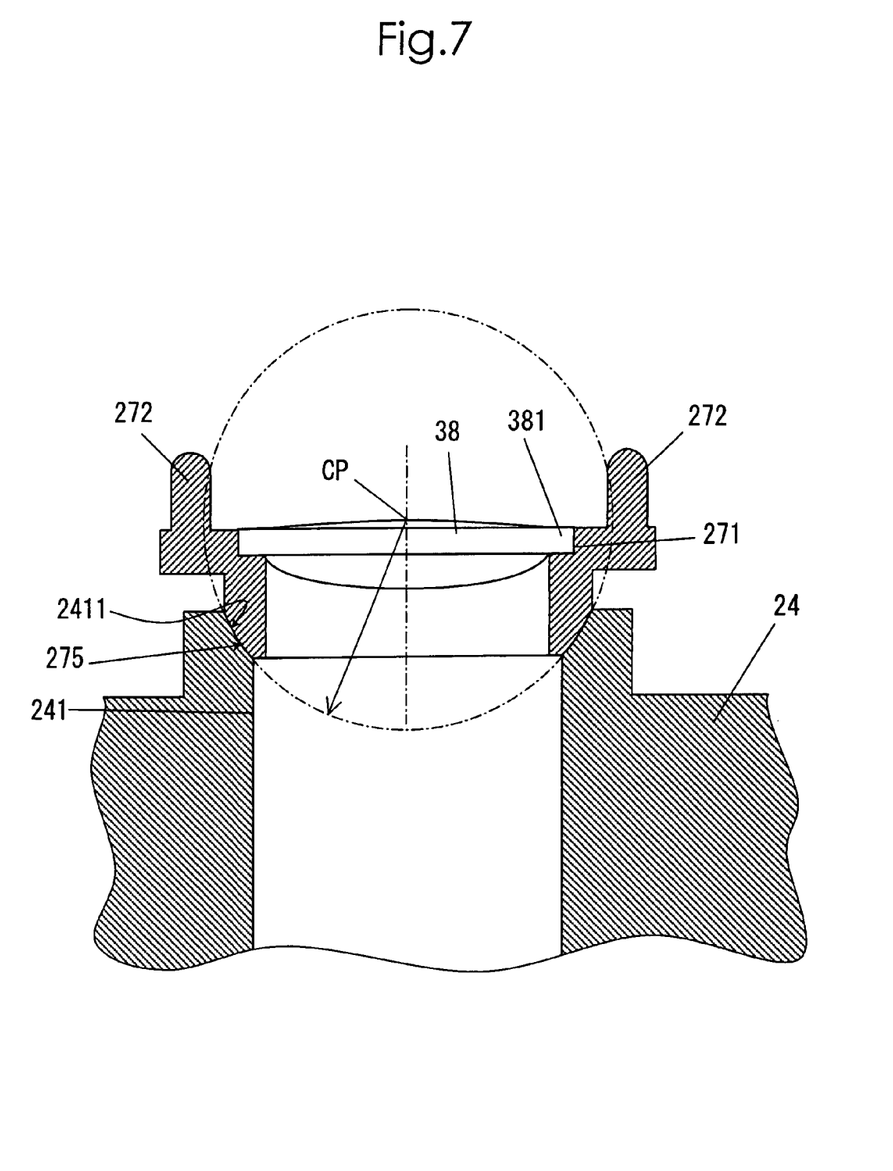
FIG. 7 is a cross sectional view of the first objective lens mounting hole shown in FIG. 6.

FIG. 6 is a plan view of a spacer that is used for the optical pickup according to the present invention, and FIG. 7 is a cross sectional view of the spacer shown in FIG. 6. As shown in FIGS. 4, 5, 6 and 7, the first objective lens 38 is attached to the objective lens holder 24 via the spacer 27. The spacer 27 includes an objective lens receiving portion 271 formed on the inner surface to have a stepped shape in which the first objective lens 38 fits, protruding portions 272 that protrude from the outer surface, a positioning portion 273 that protrudes from the outer surface in the radial direction, two press portions 274 that protrudes from the outer surface in the radial direction at positions away from the positioning portion 273 in the circumferential direction of the spacer 27 in the opposite direction, and a salient portion 275 having a spherical shape formed on the lower side.

As shown in FIGS. 5 and 7, the first mounting hole 241 of the objective lens holder 24 is provided with a recess 2411 having a spherical shape in which the salient portion 275 having a spherical shape of the spacer fits. When the salient portion 275 having a spherical shape fits in the recess 2411 having a spherical shape, the spacer 27 retaining the first objective lens 38 is attached to the first mounting hole 241.

The supported portion 381 of the first objective lens 38 fits in the lens receiving portion 271. The supported portion 381 of the first objective lens 38 may be adhered to the lens receiving portion 271, if necessary. In this case, the adhesive is preferably a one that can be dried in a short period and is not contracted largely when it is cured. As such an adhesive, an ultraviolet curing adhesive can be adopted, for example, though it is not a limitation.

In order to inject the adhesive into a gap between the lens receiving portion 271 of the spacer 27 and the supported portion 381 of the first objective lens 38, a groove (not shown) for injecting the adhesive may be formed on the inner curved surface of the lens receiving portion 271 of the spacer 27. By forming the groove in which the adhesive can be injected, it is able to prevent a malfunction such as overflow of the adhesive that may blur or deform the first objective lens 38 when the first objective lens 38 is fixed to the spacer 27.

As shown in FIGS. 5, 6 and 7, the protruding portions 272 are formed integrally to protrude upward from the overhang portions that overhang from the outer rim of the spacer 27 in the radial direction. The tip of the protruding portion 272 is formed to have a curved surface and to be symmetric with respect to the center of the spacer 27. As shown in FIG. 5, the tip of the protruding portion 272 is formed to protrude upward higher than the attachment portion 2421 of the second mounting hole 242 to which the second objective lens 48 is attached. In addition, at least the tip portion of the protruding portion 272 is made of a material having cushioning properties such as POM (Polyoxymethylene or polyacetal resin). It is not limited to POM, but various materials having cushioning properties can be adopted widely. In addition, the entire spacer including the protruding portion 242 may be made of a material having cushioning properties as described above, or only the protruding portion 242 may be made of a material having cushioning properties and attached to the spacer 24

The positioning portion 273 is provided with a through hole 2731. When the spacer 27 is attached to the first mounting hole 241, positioning of the spacer 27 is performed and it is prevented from rotating around the axis by inserting a jig in the through hole 2731. After the spacer 27 is positioned with the positioning portion 273, the press portion 274 is pressed appropriately so that the salient portion 275 of the spherical shape can be moved to slide along the recess 2411 of the spherical shape of the first mounting hole 241. Thus, a tilt of the fit-in first objective lens 38 can be adjusted. A tilt angle (tilt quantity) of the first objective lens 38 can be adjusted by adjusting heights of three points of the spacer 27.

The salient portion 275 having the spherical shape is formed on the bottom face of the spacer 27 so that its center point CP becomes an optical principal point of the first objective lens 38 that fits in the spacer 27. In addition, the recess 2411 having the spherical shape of the first mounting hole 241 is also formed so that its center point becomes an optical principal point of the first objective lens 38 that fits in the spacer 27, in the same manner as the spherical shape salient portion 275. In this way, since the salient portion 275 having the spherical shape and the recess 2411 having the spherical shape have the centers to be the optical principal point of the first objective lens 38, the optical axis of the laser beam that enters from the lower side of the first mounting hole 241 passes through the optical principal point of the first objective lens 38 even if the spacer 27 is moved for adjusting the tilt quantity of the first objective lens 38. Thus, the laser beam can be condensed on the recording surface of the CD medium or the DVD medium accurately.

Note that the spacer 27 may be bonded to the first mounting hole 241 after the adjustment of the tilt quantity of the first objective lens 38 is finished. In addition, the positioning portion 273 and the press portion 274 may be fixed to the objective lens holder 24 by using fixing members such as screws or rivets. In addition, various methods can be adopted widely for fixing the spacer 27 to the objective lens holder 24 so that the adjusted state between them is not changed after the first objective lens 38 is adjusted, without limiting to the method described above.

Here, the tilt quantity of the first objective lens 38 is adjusted to be the same as the tilt quantity of the second objective lens 48 fixed to the second objective lens mounting hole 242 (see FIG. 5). Thus, when the actuator 2 with the objective lens holder 24 is attached the main body 1 of the optical pickup A, the optical axis of the second objective lens 48 is adapted to be perpendicular to the recording surface of the BD medium, so that optical axis of the first objective lens 38 is also perpendicular to the recording surface of the CD medium or the DVD medium. Thus, occurrence of coma aberration due to a shift of the tilt quantity of the first objective lens 38 can be reduced.

When the tilt quantity of the first objective lens 38 is adjusted, it is possible to adopt the structure in which light for adjustment is projected to the first objective lens 38 and the second objective lens 48 by automatic collimator, and reflection light from its edge surface is received.

In this way, since the tilt quantity of the first objective lens 38 is adjusted to be the same or substantially the same as the tilt quantity of the second objective lens 48, optical axes of the infrared laser beam, the red laser beam and the blue laser beam become parallel to each other. Thus, when the actuator 2 is disposed so that the blue laser beam that passed through the second objective lens 48 is perpendicular to the recording surface of the BD medium, the infrared laser beam emitted from the first objective lens 38 can be projected so as to be perpendicular or substantially perpendicular to the recording surface of the CD medium while the red laser beam can be projected so as to be perpendicular or substantially perpendicular to the recording surface of the DVD medium. In this way, only by disposing the actuator 2 so as to match the tilt quantity of the second objective lens 48, the first objective lens 38 also becomes to have an appropriate tilt quantity with respect to the CD medium and the DVD medium, so it is able to support a BD, a DVD and a CD only by adjusting the actuator 2. As a result, time and effort necessary for assembling and adjustment can be reduced, and so cost necessary for assembling and adjustment can be reduced.

In the optical pickup A, when the laser beam is projected to the recording surface of the optical disc that is the CD medium, the DVD medium or the BD medium for recording or reproducing data, the actuator 2 first performs focusing pull-in operation for condensing the laser beam appropriately on the recording surface. The focusing pull-in operation is a known technique, so detailed description thereof will be omitted. When the actuator 2 performs the focusing pull-in operation, it moves the objective lens holder 24 largely. In this case, the objective lens holder 24 may approach the optical disc too closely and may contact with it. According to the optical pickup A of the present invention, even if the objective lens holder 24 approaches the optical disc and is about to contact with the optical disc, the protruding portion 272 of the spacer 27 to which the first attachment portion 241 is attached contacts with the optical disc. Other portions of the objective lens holder 24, e.g., the second objective lens 48, the second mounting hole 242 and the like are prevented from contacting with the optical disc.

Since the protruding portion 272 has cushioning properties, it is able to prevent the surface of the optical disc from being damaged when the protruding portion 272 contacts with the optical disc. In addition, it is able to prevent the second objective lens 48 or the like from being damaged when it contacts with the optical disc. As a result, waste of media can be prevented that may occur if the surface of the optical disc is damaged and cannot be used for recording and reproducing. Furthermore, it is able to avoid unstable operation of recording and reproducing when the second objective lens 48 of the optical pickup A is damaged so that the optical pickup can have high reliability.

In addition, since the tilt quantity of the first objective lens 38 can be adjusted, it is not necessary to keep high accuracy of finishing a retained portion 381 of the first objective lens 38, a retained portion 481 of the second objective lens 48, the first objective lens mounting hole 241 and the second objective lens mounting hole 242. Therefore, it is able to reduce manufacturing and assembling cost largely.

Although the example described above explains the structure in which the first objective lens 38 is attached to the objective lens holder 24 via the spacer 27, it can be the structure in which the second objective lens 48 is attached to the same via a spacer. In this case, the length of the protruding portion can be reduced so that the spacer can be made easily.

Figure 8:
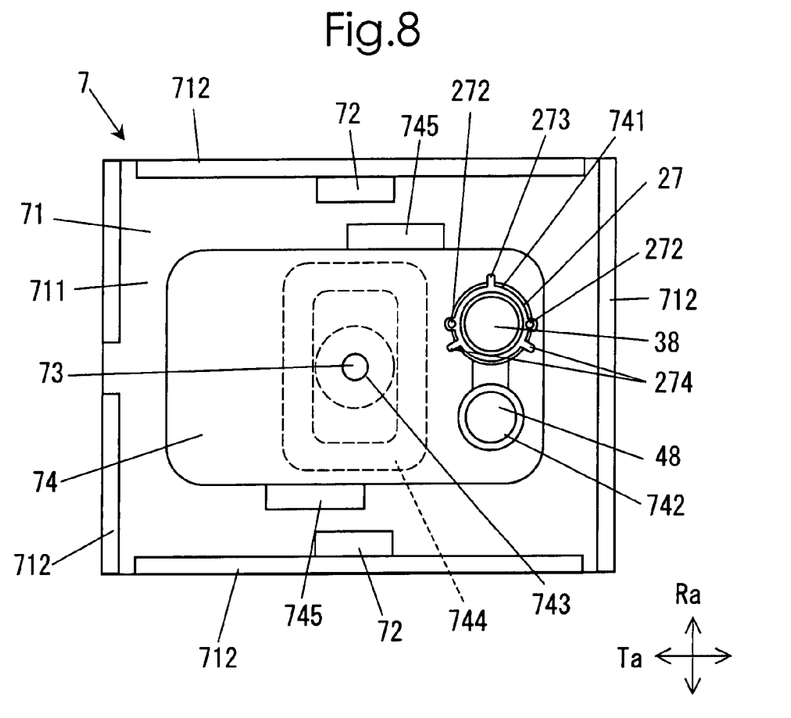
FIG. 8 is a plan view of another example of the actuator that is used for the optical pickup according to the present invention.
Figure 9:
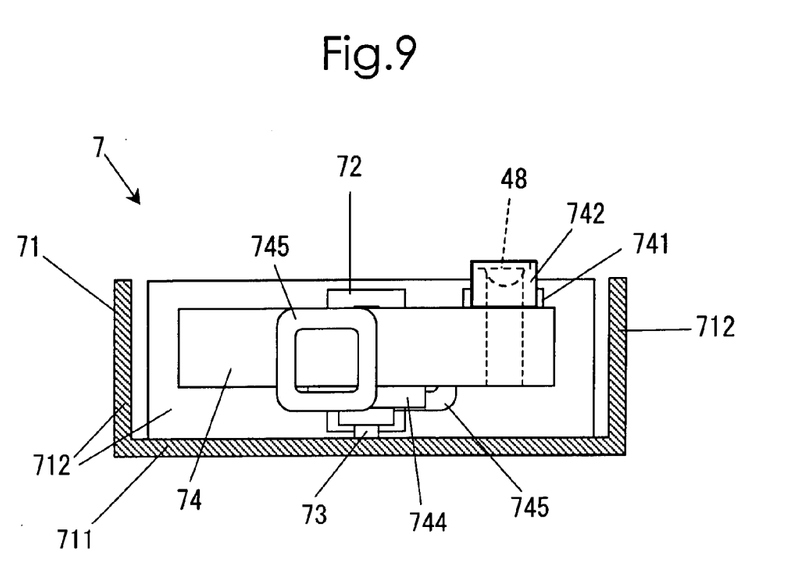
FIG. 9 is a cross sectional view of the actuator shown in FIG. 8.
Figure 10:
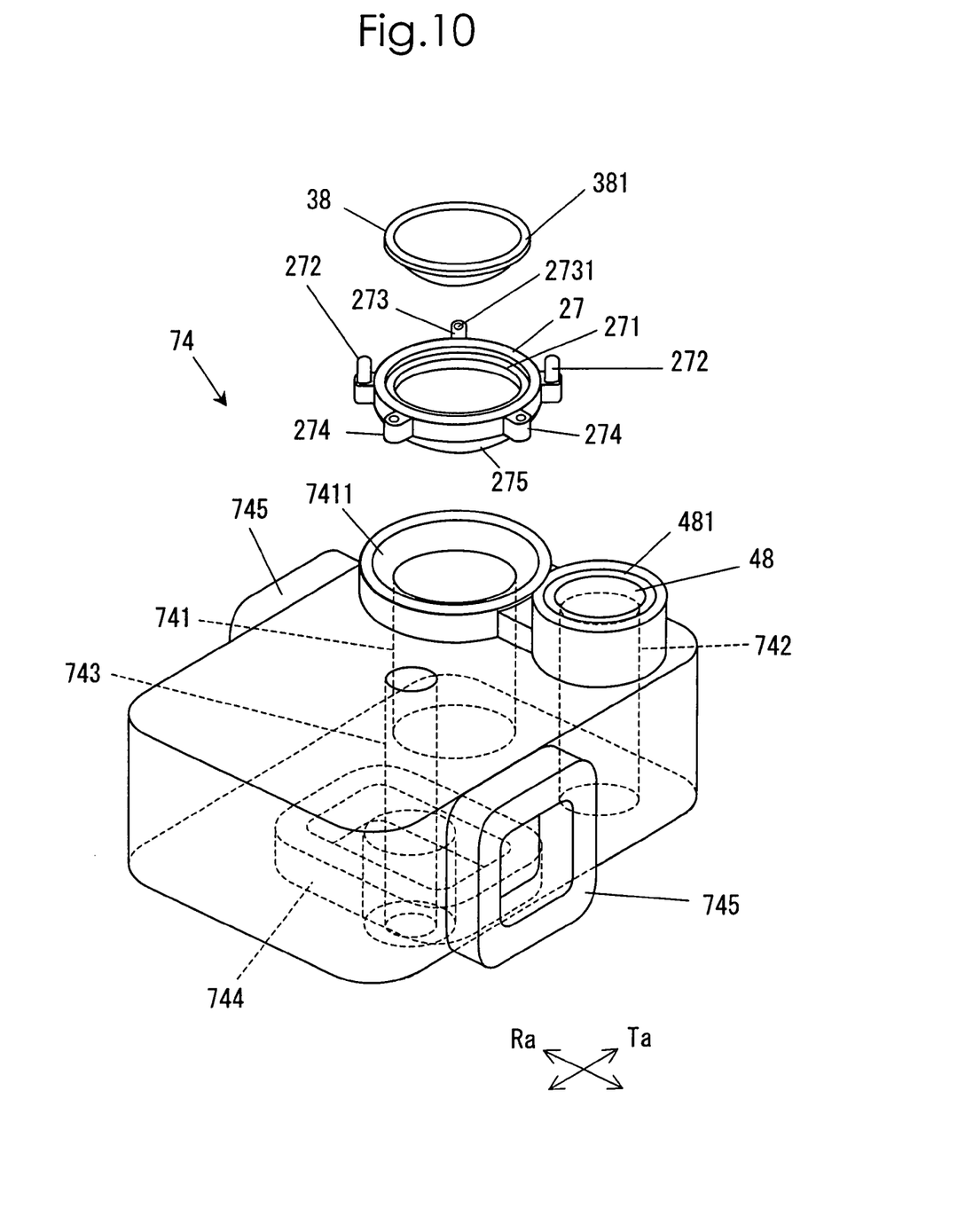
FIG. 10 is a perspective view of the actuator shown in FIG. 8.

FIG. 8 is a plan view of an actuator according to another example that is used for the optical pickup according to the present invention, FIG. 9 is a cross sectional view of the actuator shown in FIG. 8, and FIG. 10 is a perspective view of an objective lens holder that is used for the actuator shown in FIG. 8. The actuator 7 shown in FIGS. 8 and 9 is attached to a shaft 73 in a slidable and rotatable manner, and the shaft 73 is attached to the actuator base 71.

The actuator 7 shown in FIGS. 8 and 9 includes the actuator base 71, a permanent magnet 72, the shaft 73, an objective lens holder 74 for holding the first objective lens 38 and the second objective lens 48, a focusing coil 744 and a tracking coil 745. In the drawings, reference Ta denotes a tangential direction (circumferential direction) of the optical disc medium (the CD medium, the DVD medium and the BD medium), while reference Ra denotes a radial direction. As shown in FIG. 10, as to the actuator 7, the first objective lens 38 and the second objective lens 48 are arranged side by side in the Ra direction.

The actuator base 71 has a rectangular shape in a plan view and includes a bottom portion 711 and rising portions 712 that rise from the rim of the bottom portion 711 perpendicularly to the bottom portion 711. A cylindrical shaft 73 is formed to stand at substantially the middle portion of the bottom portion 711 and protrudes in the same direction as the rising portion 712. The rising portions 712 are provided with two permanent magnets 72 that are opposed to each other with the shaft 713 between them (the number of the permanent magnets is not limited to two).

As shown in FIG. 10, the objective lens holder 74 includes a first mounting hole 741 to which the spacer 27 with the first objective lens 38 is attached, a second mounting hole 742 to which the second objective lens 48 is attached, a shaft hole 743 that is formed in substantially the middle portion of the main body and allows the shaft 73 to pass through, the focusing coil 744 disposed so as to surround the shaft hole 743, the tracking coils 745 disposed at the side faces of the objective lens holder 74 so as to be opposed to each other with the shaft hole 743 between them, and a magnetic plate (not shown) disposed under the focusing coil 744.

A recess 7411 having a spherical shape is formed at the first mounting hole 741 and receives the spacer 27. The recess 7411 having the spherical shape contacts with the salient portion 275 having the spherical shape of the spacer 27. The center of the recess 7411 having the spherical shape matches the center of the salient portion 275 having the spherical shape and is adapted so as to match the optical principal point of the first objective lens 38 that fits in the spacer 27.

Although the spacer that retains the first objective lens 38 is exemplified as shown in FIG. 6 or the like, this should not be interpreted as a limitation. Any spacer having a protruding portion that can contact with the optical disc before the objective lens and/or the objective lens holder contact with the optical disc can be adopted widely.

The first optical system for recording and reproducing the CD medium and/or the DVD medium and the second optical system for recording and reproducing the BD medium are provided independently of each other in each example described above, the present invention is not limited to this structure. It is possible that a part (e.g., from the polarizing beam splitter to the quarter wave plate) may be shared by the two optical systems. In this case, it is necessary to provide a member that divides the laser beam that passed through the quarter wave plate so that the infrared laser beam and the red laser beam enter the first objective lens while the blue laser beam enters the second objective lens. However, by this sharing, the optical pickup can be downsized, the number of components can be reduced, and time and effort for assembling and adjusting can be reduced, so that manufacturing cost can be reduced.

Although embodiments of the present invention are described above in detail, the present invention is not limited to the embodiments described above, which can be modified variously within the scope of the present invention without deviating from the spirit of the present invention. The present invention may include a plurality of features that are described in the embodiments.

What is claimed is:

1. An optical pickup that projects a laser beam to an optical disc medium for recording or reproducing data, comprising:
   a first objective lens;
   a second objective lens having a numerical aperture different from that of the first objective lens;
   an objective lens holder that holds the first objective lens and the second objective lens; and
   a spacer that retains the first objective lens and is attached to the objective lens holder, wherein
   the spacer has a cylindrical shape and is provided with a lens receiving portion of a stepped shape formed at an inner surface thereof for receiving the first objective lens, a protruding portion having cushioning properties that protrudes from an upper surface, and a salient portion having a spherical shape formed at a lower surface,
   the objective lens holder has a first mounting hole that passes through from the lower surface to the upper surface to which the spacer retaining the first objective lens is attached, and a second mounting hole that passes through from the lower surface to the upper surface to which the second objective lens is fixed,
   the second objective lens is disposed closer to the optical disc medium than the first objective lens, and
   the protruding portion of the spacer is formed so that a tip thereof is closer to the optical disc medium than the second objective lens.

2. The optical pickup according to claim 1, wherein the protruding portion is formed integrally with the spacer.

3. The optical pickup according to claim 1, wherein the protruding portion is formed to have a tip of a curved surface.

4. The optical pickup according to claim 2, wherein the protruding portion is formed to have a tip of a curved surface.

5. The optical pickup according to claim 1, wherein the salient portion having a spherical shape is a part of a spherical shape having a center that is an optical principal point of the first objective lens that fits in the spacer.

6. The optical pickup according to claim 2, wherein the salient portion having a spherical shape is a part of a spherical shape having a center that is an optical principal point of the first objective lens that fits in the spacer.

7. The optical pickup according to claim 3, wherein the salient portion having a spherical shape is a part of a spherical shape having a center that is an optical principal point of the first objective lens that fits in the spacer.

8. The optical pickup according to claim 1, wherein a recess having a spherical shape in which the salient portion having a spherical shape fits, is formed at upper side edge portion of the first mounting hole.

9. The optical pickup according to claim 2, wherein a recess having a spherical shape in which the salient portion having a spherical shape fits, is formed at an upper side edge portion of the first mounting hole.

10. The optical pickup according to claim 3, wherein a recess having a spherical shape in which the salient portion having a spherical shape fits, is formed at an upper side edge portion of the first mounting hole.

11. The optical pickup according to claim 5, wherein a recess having a spherical shape in which the salient portion having a spherical shape fits, is formed at an upper side edge portion of the first mounting hole.

12. The optical pickup according to claim 1, further comprising an elastic support member that supports the objective lens holder elastically, wherein electric power is supplied to a tracking coil and a focusing coil for driving the objective lens holder via the elastic support member.

13. The optical pickup according to claim 2, further comprising an elastic support member that supports the objective lens holder elastically, wherein electric power is supplied to a tracking coil and a focusing coil for driving the objective lens holder via the elastic support member.

14. The optical pickup according to claim 3, further comprising an elastic support member that supports the objective lens holder elastically, wherein electric power is supplied to a tracking coil and a focusing coil for driving the objective lens holder via the elastic support member.

15. The optical pickup according to claim 5, further comprising an elastic support member that supports the objective lens holder elastically, wherein electric power is supplied to a tracking coil and a focusing coil for driving the objective lens holder via the elastic support member.

16. The optical pickup according to claim 8, further comprising an elastic support member that supports the objective lens holder elastically, wherein electric power is supplied to a tracking coil and a focusing coil for driving the objective lens holder via the elastic support member.

17. The optical pickup according to claim 1, further comprising an elastic support member that supports the objective lens holder elastically, wherein electric power is supplied to a tracking coil and a focusing coil for driving the objective lens holder via the elastic support member.

18. The optical pickup according to claim 1, wherein the objective lens holder is retained in a slidable and rotatable manner by a rotating shaft that passes through the objective lens holder.

19. The optical pickup according to claim 2, wherein the objective lens holder is retained in a slidable and rotatable manner by a rotating shaft that passes through the objective lens holder.

20. The optical pickup according to claim 3, wherein the objective lens holder is retained in a slidable and rotatable manner by a rotating shaft that passes through the objective lens holder.

21. The optical pickup according to claim 5, wherein the objective lens holder is retained in a slidable and rotatable manner by a rotating shaft that passes through the objective lens holder.

22. The optical pickup according to claim 8, wherein the objective lens holder is retained in a slidable and rotatable manner by a rotating shaft that passes through the objective lens holder.

23. The optical pickup according to claim 1, wherein the objective lens holder is retained in a slidable and rotatable manner by a rotating shaft that passes through the objective lens holder.

24. The optical pickup according to claim 12, wherein the objective lens holder is retained in a slidable and rotatable manner by a rotating shaft that passes through the objective lens holder.

25. The optical pickup according to claim 1, wherein at least two types of optical disc media among CD media, DVD media and BD media can be recorded and reproduced by the optical pickup.

26. The optical pickup according to claim 2, wherein at least two types of optical disc media among CD media, DVD media and BD media can be recorded and reproduced by the optical pickup.

27. The optical pickup according to claim 3, wherein at least two types of optical disc media among CD media, DVD media and BD media can be recorded and reproduced by the optical pickup.

28. The optical pickup according to claim 5, wherein at least two types of optical disc media among CD media, DVD media and BD media can be recorded and reproduced by the optical pickup.

29. The optical pickup according to claim 8, wherein at least two types of optical disc media among CD media, DVD media and BD media can be recorded and reproduced by the optical pickup.

30. The optical pickup according to claim 1, wherein at least two types of optical disc media among CD media, DVD media and BD media can be recorded and reproduced by the optical pickup.

31. The optical pickup according to claim 12, wherein at least two types of optical disc media among CD media, DVD media and BD media can be recorded and reproduced by the optical pickup.

32. The optical pickup according to claim 18, wherein at least two types of optical disc media among CD media, DVD media and BD media can be recorded and reproduced by the optical pickup.

33. An optical pickup that projects a laser beam to an optical disc medium for recording or reproducing data, comprising:
an infrared laser light source that emits an infrared laser beam;
a red laser light source that emits a red laser beam;
a blue laser light source that emits a blue laser beam;
a first objective lens that condenses the infrared laser beam or the red laser beam onto a recording surface of a CD medium or a DVD medium that is the optical disc medium;
a second objective lens that condenses the blue laser beam onto a recording surface of a BD (Blu-ray Disc) medium that is the optical disc medium;
an objective lens holder that holds the first objective lens and the second objective lens and is capable of moving in a tracking direction and in a focusing direction;
a tracking coil that generates a force to drive the objective lens holder in the tracking direction;
a focusing coil that generates a force to drive the objective lens holder in the focusing direction;
an elastic support member that supports the objective lens holder and supplies electric power to the tracking coil and the focusing coil; and
a spacer that retains the first objective lens and is attached to the lens holder, wherein
the spacer has a cylindrical shape and is provided with a lens receiving portion of a stepped shape formed at the inner surface for receiving the first objective lens, two protruding portions having cushioning properties that protrude from the upper surface and are formed to have a tip of a curved surface, a positioning portion that protrudes in the radial direction from the outer peripheral surface for positioning the spacer, two press portions that protrude in the radial direction from the outer peripheral surface away from the positioning portion to the opposite directions by the same angle, and a salient portion formed at the lower surface to have a spherical shape with a center that is a optical principal point of the first objective lens fitting in the spacer, the objective lens holder is provided with a first mounting hole that passes through from the lower surface to the upper surface and has a recess having a spherical shape in which the salient portion of the spacer with the first objective lens fits, and a second mounting hole that passes through from the lower surface to the upper surface had has a fixing portion of a stepped shape to which the second objective lens is engaged and fixed, the fixing portion is formed so that the second objective lens is closer to the optical disc medium than the first objective lens, and the protruding portion of the spacer is fowled so that a distance between the tip thereof and the optical disc medium is shorter than a distance between the second objective lens and the optical disc medium.

* * * * *